US007173805B2

(12) United States Patent
Lee

(10) Patent No.: US 7,173,805 B2
(45) Date of Patent: Feb. 6, 2007

(54) POLYMER MATERIAL

(75) Inventor: Shirley Lee, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/896,510

(22) Filed: Jul. 20, 2004

(65) Prior Publication Data

US 2006/0019101 A1 Jan. 26, 2006

(51) Int. Cl.
*H01G 9/00* (2006.01)

(52) U.S. Cl. ...................... 361/502; 428/423.1; 528/44

(58) Field of Classification Search ..................... None
See application file for complete search history.

(56) References Cited

U.S. PATENT DOCUMENTS

| | | | |
|---|---|---|---|
| 4,526,852 A | 7/1985 | Herrmann et al. | |
| 5,011,739 A | 4/1991 | Nielsen et al. | |
| 5,320,923 A * | 6/1994 | Nguyen | 430/78 |
| 5,434,653 A | 7/1995 | Takizawa et al. | |
| 5,471,285 A | 11/1995 | Nagase et al. | |
| 5,554,474 A | 9/1996 | Vreeland et al. | |
| 5,600,422 A | 2/1997 | Fukami et al. | |
| 5,602,712 A | 2/1997 | Daifuku et al. | |
| 5,639,847 A | 6/1997 | Chiang et al. | |
| 5,656,344 A | 8/1997 | Sawa et al. | |
| 5,731,078 A | 3/1998 | Hsieh et al. | |
| 5,774,768 A | 6/1998 | Hazama et al. | |
| 5,898,057 A | 4/1999 | Chiang et al. | |
| 5,933,693 A | 8/1999 | Sakata et al. | |
| 5,987,297 A | 11/1999 | Kimoto et al. | |
| 6,004,669 A | 12/1999 | Rokutan et al. | |
| 6,063,499 A | 5/2000 | Chiang et al. | |
| 6,111,051 A | 8/2000 | Chiang et al. | |
| 6,140,405 A | 10/2000 | Eckstein et al. | |
| 6,184,331 B1 | 2/2001 | Chiang et al. | |
| 6,352,771 B1 | 3/2002 | Chiang et al. | |
| 6,361,484 B1 | 3/2002 | Chen et al. | |
| 6,417,315 B2 | 7/2002 | Chiang et al. | |
| 6,433,996 B1 | 8/2002 | Hata et al. | |
| 6,451,438 B1 | 9/2002 | Chiang et al. | |
| 6,523,263 B2 | 2/2003 | Jo et al. | |
| 6,936,184 B2 | 8/2005 | Okazaki et al. | |
| 2001/0041783 A1 | 11/2001 | Chiang et al. | |
| 2002/0077402 A1 | 6/2002 | Chiang et al. | |
| 2002/0111259 A1 | 8/2002 | Chiang et al. | |
| 2002/0119324 A1 | 8/2002 | Harashima et al. | |

(Continued)

FOREIGN PATENT DOCUMENTS

| | | |
|---|---|---|
| EP | 0385462 B1 | 9/1990 |

(Continued)

OTHER PUBLICATIONS

Baboul, A.G., et al., "Li+ -(Diglyme)2 and LiC1O4-Diglyme Complexes: Barriers to Lithium Ion Migration," J. Am. Chem. Soc. 1999, 121, pp. 7220-7227.

(Continued)

*Primary Examiner*—Patricia Hightower

(57) ABSTRACT

A polymer material comprising a polyol and at least one alkaline salt. The polyol comprises at least one moiety selected from the group consisting of ethylene glycol, di(ethylene glycol), tri(ethylene glycol), tetra(ethylene glycol), poly(diethylene glycol), poly(ethylene oxide), and mixtures thereof.

18 Claims, 2 Drawing Sheets

DEG

U.S. PATENT DOCUMENTS

| | | | |
|---|---|---|---|
| 2003/0022094 | A1 | 1/2003 | Nakamura et al. |
| 2003/0071259 | A1 | 4/2003 | Yoshida |

FOREIGN PATENT DOCUMENTS

| | | | |
|---|---|---|---|
| EP | 0548741 | A2 | 6/1993 |
| EP | 0 686 890 | A2 | 12/1995 |
| EP | 1 090 939 | A1 | 4/2001 |
| EP | 1 437 381 | A1 | 7/2004 |
| JP | 03259957 | A | 11/1991 |
| JP | 06228227 | A | 8/1994 |
| JP | 08305132 | A | 11/1996 |
| JP | 2002/146178 | | 5/2002 |
| JP | 2002/338801 | | 11/2002 |
| JP | 2003/065393 | A | 3/2003 |

OTHER PUBLICATIONS

Fenton, D.E, “Complexes of Alkali Metal Ions with Poly(ethylene oxide),” POLYMER, Nov. 1973, vol. 14, p. 589.

Gray, F., et al., “Polymer Electrolytes.” Handbook of Battery Materials. Wiley-VCH, New York, 1999, pp. 499-507.

Sutjianto, A., et al., “Li+ -Diglyme Complexes: Barriers to Lithium Cation Migration,” J. Phys. Chem. A 1998, 102, pp. 968-974.

PCT International Search Report, Oct. 10, 2005, 3 pages.

* cited by examiner

POLYMER MATERIAL

BACKGROUND

Electrophotographic ("EP") devices, such as laser printers, photocopiers, fax machines, all in one devices, and multi-function devices, are used to form images. The conductive components of EP and electrostatic-dissipative devices may include polymers, such as polyurethane elastomers.

However, most polymers, such as polyurethane, have relatively low conductivity and, therefore, static charges build up on the components and may adversely affect operations of the equipment.

BRIEF DESCRIPTION OF THE DRAWINGS

The disclosed embodiments can be more readily ascertained from the following detailed description when read in conjunction with the accompanying drawings in which.

DETAILED DESCRIPTION

A polymer material, such as a polyurethane material, having increased conductivity is disclosed. The polyurethane material includes at least one alkaline salt that provides conductivity to the polyurethane material. The polyurethane material also includes a polyol having at least one moiety that increases the conductivity of the polyurethane material. The polyol may be a polyester polyol or a polyether polyol. The combination of the moiety and the alkaline salt may provide increased conductivity to the polyurethane material. The alkaline salt may be a lithium salt including, but not limited to, $LiClO_4$, lithium tetrafluoroborate ($LiBF_4$), lithium hexafluorophosphate ($LiPF_6$), lithium trifluoromethane sulfonate ($LiCF_3SO_3$), lithium bis (trifluoromethanesulfonyl) imide ($LiN(CF_3SO_2)_2$), lithium bis (perfluoroethylsulfonyl) imide ($LiN(SO_2CF_2CF_3)_2$), lithium (trifluoromethylsulfonyl)(perfluorobutylsulfonyl) imide ($LiN(CF_3SO_2)(C_4F_9SO_2)$), lithium tris (trifluoromethanesulfonyl) methane ($LiC(CF_3SO_2)_3$), and mixtures thereof.

Figure 1:
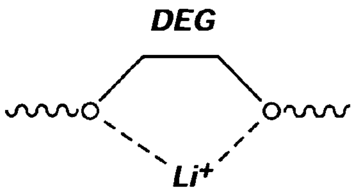
FIG. 1 is a schematic illustration of an embodiment of chelate rings formed from cation-polyether dipolar interactions of a lithium cation with a moiety, according to one embodiment.

The moiety present in the polyol may be capable of interacting with an ion of the alkaline salt. For instance, if the alkaline salt is a lithium salt, the lithium ion may chelate the moiety of the polyol. The moiety in the polymer may include a polyether functional group having at least two carbon atoms between oxygen atoms. The moiety may include ethylene glycol ("EG") ($—CH_2CH_2O—$), di(ethylene glycol) ("DEG") ($(—CH_2CH_2O—)_2$), tri(ethylene glycol) ("TEG"), tetra(ethylene glycol), poly(diethylene glycol), poly(ethylene oxide), and mixtures thereof. As shown in FIG. 1, polyols with moieties having at least two carbon atoms between the oxygen atoms, such as DEG and TEG, are relatively effective in chelating the lithium ion. The polyol may have a content of the moiety (a poly(ethylene glycol) unit, which is also referred to as polyethylene oxide, (PEO, EG, DEG, etc.)) that is at least approximately 20% by molar. In one embodiment, the moiety is present at at least approximately 30% by molar. In another embodiment, the moiety is present at at least approximately 50% by molar, such as at least approximately 80% by molar.

The DEG or EG may provide sufficient spacing between the oxygen atoms to form an energetically favored 5-membered ring, which provides relatively high solvation of the cation of the alkaline salt.

Without being tied to a particular theory, it is believed that that if the polyol includes the EG moiety and adipic acid, the EG moiety is not as effective of a chelator as DEG due to sharing of the resonance structure with the carboxyl group.

The polyol may also have a low glass transition temperature ("$T_g$"). Since it is believed that transport of the alkaline ion depends on its interaction with the EG or DEG moiety on the polyol, the mobility of the polyol may play a role. A low $T_g$ of the polyol may be desired because the lower the $T_g$, the higher the ion transport efficiency. The $T_g$ of the polyol may be less than approximately −38° C. The $T_g$ of the polyol may depend on the chemical structures of the polyol and isocyanate used in the polyol. By utilizing a polyol having a low $T_g$, the polyol may have a higher mobility, which provides fast lithium ion transport to the polyurethane material. The fast lithium ion transport corresponds to a short electrical response time or relaxation time for the polyurethane material, which may reduce electrical memory and ghosting in the electrophotographic printing process.

The polyol may be a polyester polyol or a polyether polyol. The polyol may be synthesized by techniques including a condensation reaction of a diol with a dicarboxylic acid. The diol may include, but is not limited to, a glycol. For instance, a polyalkylene glycol, such as DEG, TEG, tetraethylene glycol, or mixtures thereof may be used. The dicarboxylic acid may include, but is not limited to, adipic acid ("AA"), malonic acid, glutaric acid, pimelic acid, azelaic acid, sebacic acid, suberic acid, brassylic acid, succinic acid, decanedicarboxylic acid, dodecanedicarboxylic acid, 1,3-cyclohexanedicarboxylic acid, 1,4-cyclohexanedicarboxylic acid, phthalic acid, terephthalic acid, isophthalic acid, and mixtures thereof. In one embodiment, the polyester polyol includes AA and DEG and has the following structure:

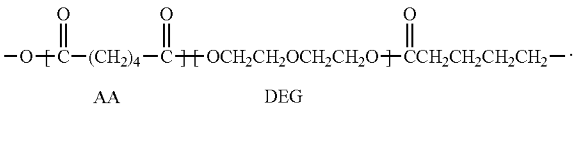

In another embodiment, the polyester polyol includes AA and TEG. It is understood that other dicarboxylic acids, besides AA, may be used in the polyester polyol. Examples of polyether polyols include, but are not limited to, poly (ethylene glycol), poly(propylene glycol), and poly(tetramethylene glycol).

Isocyanate compounds may be used in the polyaddition reaction to cure or crosslink the polyol. Isocyanate compounds may include, but are not limited to, a diisocyanate, such as tolylenediisocyanate, 4,4-diphenylmethanediisocyanate, xylylenediisocyanate, naphthylenediisocyanate, paraphenylenediisocyanate, tetramethylxylenediisocyanate, hexamethylenediisocyanate, dicyclohexylmethanediisocyanate, isophoronediisocyanate, or tolidinediisocyanate.

Polyols having the moieties described above are commercially available. Examples of polyester polyols include Desmophen® 1700 and Desmophen® 1800, which are available from Bayer Polymers (Pittsburgh, Pa.), and 3500DEA, which is available from Specialty Resins Corp. (Auburn, Me.). Examples of polyether polyols include Multranol® from Bayer Polymers (Pittsburgh, Pa.) and Voranol® from Dow Chemicals (Midland, Mich.).

The alkaline salt may be present at a concentration ranging from approximately 0.01 wt % of a total weight of the polyurethane material to approximately 10 wt % of the total weight of the polyurethane material. In one embodiment, the alkaline salt is present from approximately 0.01 wt % of the total weight of the polyurethane material to approximately 5 wt % of the total weight of the polyurethane material.

The polyurethane material may optionally include additional ingredients, depending on the desired properties of the polyurethane material. These ingredients may include, but are not limited to, cure accelerators, flame retardants, thickeners, anti-foaming agents, light stabilizers, antioxidizers, leveling agents, or wetting agents.

The polyurethane material may be formed by adding the alkaline salt to the polyol or a precursor of the polyol. The alkaline salt may be added to the polyol at a temperature ranging from approximately 25° C. to approximately 100° C. When the alkaline salt is dissolved, the polyol may be combined with the isocyanate composition to form the polyurethane material. If the polyurethane material utilizes any of the optional ingredients, these optional ingredients may also be combined with the alkaline salt and the polyol. For instance, the alkaline salt may be added to a solution of the polyol or a precursor of the polyol. The solution may then be cured to produce the polyurethane material. The alkaline salt may be blended with the polyol before the polyol is crosslinked so that the alkaline salt is evenly and homogeneously blended and dispersed in the polyurethane material.

The polyurethane material may have a low resistivity or a high conductivity. As would be understood by one of ordinary skill in the art, resistivity is the inverse of conductivity. In contrast, a polyurethane material lacking the moiety in the polyol may have a significantly higher resistivity. The polyurethane material also may have a long shelf-life or long life span.

Since the moiety or moieties in the polyol increases the conductivity of the polyurethane material, the alkaline salt may be present in the polyurethane material at a lower concentration. In other words, a lower concentration of the alkaline salt may be used to achieve a desired conductivity. Therefore, the problems previously associated with large amounts of lithium salts may be ameliorated.

Figure 2:
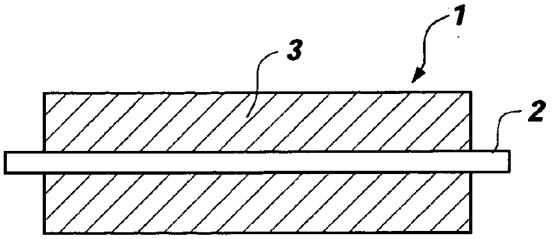
FIG. 2 is a schematic sectional view of an embodiment of a roller used in an embodiment of an electrophotographic device.

The polyurethane material may be formed into a desired shape, such as by placing the polyurethane material into an appropriately shaped mold. Alternatively, the polyurethane material may be coated, sprayed, or otherwise applied onto a substrate. For the sake of example only, the polyurethane material may be formed into a roller, plate, square block, sphere, or brush. The roller 1 may include a shaft 2 and a layer of the polyurethane material 3 surrounding the shaft 2, as illustrated in FIG. 2. The polyurethane material 3 may be a solid layer of the polyurethane material 3 or a foamed layer of the polyurethane material 3. The foamed layer may be produced by a variety of techniques, such as by foaming the isocyanate compound, using a foaming agent, or using mechanical agitation.

The shaft 2 of the roller 1 may be a solid metal mandrel or a hollow metal cylinder formed from a conductive metal including, but not limited to, iron, copper, or stainless steel. Alternatively, the shaft 2 may be formed from a conductive plastic. The polyurethane material 3 may be applied to the outer periphery of the shaft 2 by coating the shaft 2 with the polyurethane material 3 or by dipping the shaft 2 into a solution of the polyurethane material 3. The polyurethane material 3 may then be dried. For the sake of example only, the roller 1 may be a developer roller. However, the polyurethane material may also be used in other types of rollers 1 that dissipate electrical charge or perform charge management functions, such as transfer rollers or charge rollers. The polyurethane material may also be used in image transfer blankets, electrostatic dissipative devices, electromagnetic ("EM") shielding, or paper handling devices.

Figure 3:
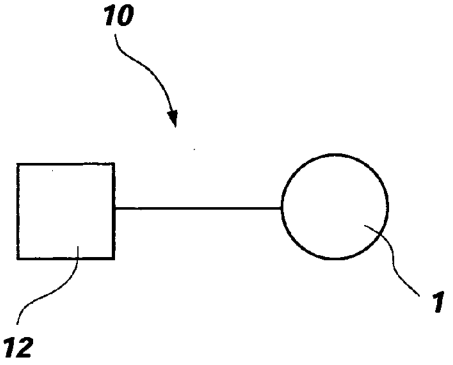
FIG. 3 is a schematic illustration of an embodiment of a developer system.
Figure 4:
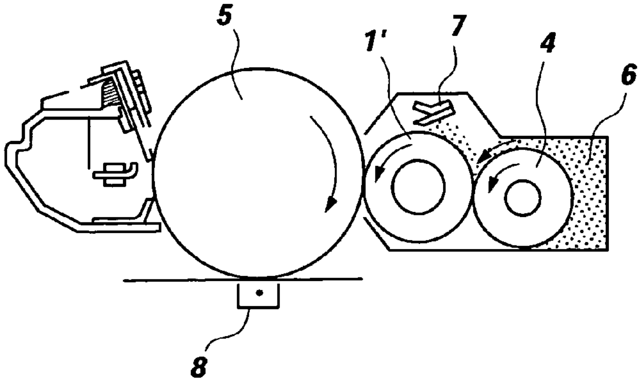
FIG. 4 is a schematic illustration of an embodiment of an electrophotographic device.

The roller 1 may be used in a developer system 10, as shown in FIG. 3. The developer system 10 may also include a power supply 12 in operative communication with the roller 1 such that, in operation, the power supply 12 drives the roller 1. The developer system 10 may be incorporated into an EP device 12 or an electrostatic-dissipative device, such as a liquid electrophotographic ("LEP") device or a dry electrophotographic device, as shown in FIG. 4. The LEP device may include, but is not limited to, a LEP printer or system. The dry electrophotographic device may include, but is not limited to, a laser printer. The polyurethane material may also be used in other industrial situations where it is desired to control surface charge, such as to dissipate electrical or static charge. For instance, the polyurethane material may be used to coat belts, shafts, rollers, friction liners, pads, or wheels in devices where electrostatic charge management may be used. The polyurethane material may also be used to coat belts in other devices, such as the belts used to transport semiconductor wafers during their fabrication. The polyurethane material may also be used to coat semiconductive materials, such as integrated circuit boards, car body parts, or machine body parts.

As previously mentioned, the roller 1 may be a developer roller 1' in an EP device 12, as illustrated in FIG. 4. The developer roller 1' may be located between a toner applicator roller 4 and a photoreceptor 5 having a latent image thereon. The developer roller 1' may be located proximate to the photoreceptor 5, but slightly spaced from the toner applicator roller 4. The developer roller 1', the photoreceptor 5, and the toner applicator roller 4 may rotate in directions shown by the arrows. The toner applicator roller 4 may supply toner 6 to the surface of the developer roller 1'. The toner 6 may then be leveled into a uniform layer by a distributing blade 7. As the developer roller 1' rotates in contact with the photoreceptor 5, the toner 6 may be impressed to the latent image on the photoreceptor 5 for visualizing the latent image. The toner image may then be transferred from the photoreceptor 5 to a print medium, such as sheet of paper, in a transfer section 8.

The following examples describe polyurethane materials that may be used in various embodiments. The examples are merely illustrative and are not meant to limit the scope of the claimed subject matter in any way.

EXAMPLES

Example 1

Resistivity of Polyurethane Material With and Without the DEG Moiety

Polyurethane coupons were prepared that included $LiClO_4$ and the polyester polyols indicated in Table 1. Each of formulations A–G included a DEG polyester polyol(s) and $LiClO_4$. Formulation I included non-DEG polyester polyol(s) and $LiClO_4$. The polyurethane coupons were prepared by combining the indicated parts by weight of the polyester polyol(s) with the indicated percentage of $LiClO_4$. The materials were then cured with isocyanates, such as Mondur 501® from Bayer Polymers.

TABLE 1

Formulations of Polyurethane Materials and their Resistivity Data.

| Chemical structure of polyester polyol [1] | Tradename of polyester polyol [2] | A | B | C | D | E | F | G | I |
|---|---|---|---|---|---|---|---|---|---|
| DEG – AA | 1700 (parts by weight) | | 60 | 60 | | 55 | 60 | | |
| DEG – AA | 3500DEA (parts by weight) | | | | 50 | | | | |
| DEG – AA | 1800 (parts by weight) | | 40 | 40 | 50 | 45 | 40 | 70 | |
| DEG – AA | 207 (parts by weight) | 100 | | | | | | | |
| EG + BDO – AA | 1037 (parts by weight) | | | | | | | | 100 |
| | % $LiClO_4$ [3] | 0.23 | 0.83 | 0.42 | 0.26 | 0.21 | 0.40 | 0.20 | 0.68 |
| | Volume resistivity, (Mega ohm-cm) | 5.80 | 2.20 | 2.30 | 3.50 | 6.68 | 3.00 | 14.0 | 4.60 |

[1] DEG = diethylene glycol, AA = adipic acid, BDO = butanediol, EG = ethylene glycol, TMP = trimethylopropane
[2] 1700 = Desmophen ® 1700, 3500DEA = 3500DEA, 1800 = Desmophen ® 1800, 207 = Rucoflex ® 207, Baytec 120P = Baytec ® ENC 120P, 2505 = Desmophen ® 2505, 1037 = Desmophen ® 1037-55
[3] % $LiClO_4$ = g of $LiClO_4$ per (100 g polyol resins + g isocyanate + g other additives)

Resistance of the polyurethane coupons was measured with an Agilent 4339B high resistance meter (Agilent Technologies (Palo Alto, Calif.)) at 250V having a one second charge. The dimensions of the tested polyurethane coupons were 10 cm×1 cm×0.2 cm. The resistivity of each of Formulations A–G and I is shown in Table 1.

Figure 5:
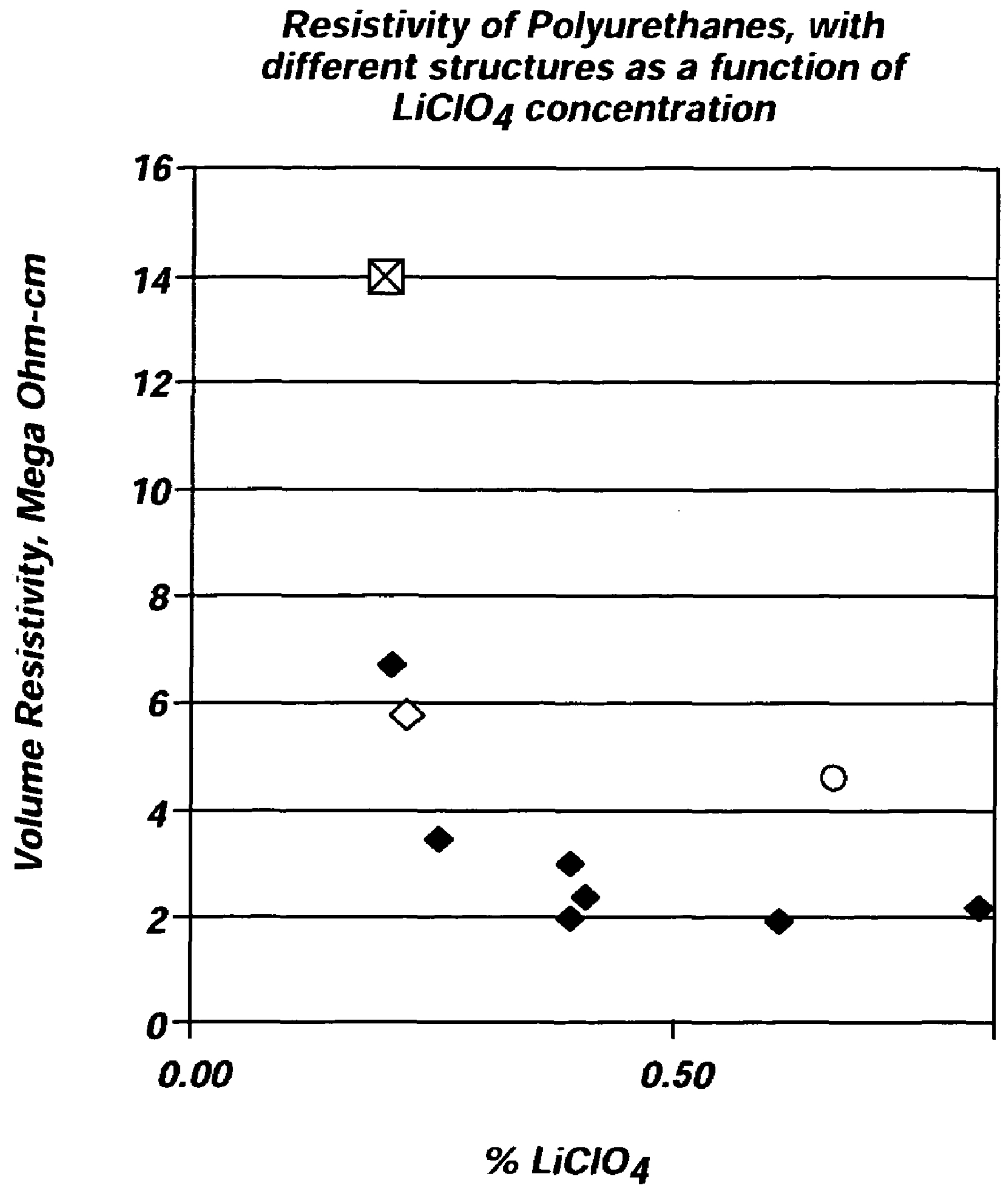
FIG. 5 shows volume resistivities of exemplary polyurethane materials as a function of lithium perchlorate ("$LiClO_4$") concentration, according to various embodiments.

The resistivity data of each of Formulations A–G and I was plotted against the percent of $LiClO_4$, as shown in FIG. 5. As shown in Table 1 and FIG. 5, Formulations A–F, which included the polyurethane materials made with the DEG-containing polyols, had lower resistivities than those made with the non-DEG polyurethane materials (Formulations G and I) at a given $LiClO_4$ concentration. In FIG. 5, the diamond-shaped symbols represent the DEG-containing polyols (Formulations A–F). The open diamond-shaped symbol represents Formulation I, which is a non-DEG polyurethane material. The circle represents Formulation G which is a non-DEG polyurethane material.

Formulations C and F included similar concentrations of $LiClO_4$ (0.40%–0.43%). Formulations C and F included DEG. Formulations C and F had resistivities of 2.30 Mega ohm-cm and 3.00 Mega ohm-cm, respectively. Since resistivity and conductivity have an inverse relationship, higher conductivities are observed with the DEG-containing polyurethane materials.

Each of Formulations B, C, E, and F included the same DEG-containing polyester polyol with differing $LiClO_4$ concentrations (0.83%, 0.42%, 0.21%, and 0.40%, respectively). A comparison of these Formulations indicates that all had a resistivity of less than approximately 7 Mega ohm-cm, which shows that the decreased resistivities were achieved even when lower $LiClO_4$ concentrations were used. The resistivity reached a plateau at about 0.45% $LiClO_4$. At higher concentrations of $LiClO_4$, smaller decreases in resistivity were observed.

In addition, the dynamic resistance of the DEG-containing polyols (Formulations A–F) was measured. After about 30 minutes of subjecting the Formulations to the measuring conditions, those Formulations having a $LiClO_4$ concentration higher than 0.83% or 1.0 phr oozed gel after resting. It is believed that these Formulations included non-chelated $LiClO_4$ (i.e., $LiClO_3$ that was not participating in ion transport), which caused gel formation.

In summary, as shown by the resistivity data, the DEG-containing polyols provided the most efficient use of the lithium ion for conductivity. In contrast, for the non-DEG polyurethane materials, additional $LiClO_4$ was added to achieve the same resistivity or amount of “mobile lithium.” However, as previously discussed, using additional $LiClO_4$ negatively affects the polyurethane material, such as decreasing long term stability and life span.

Example 2

Resistivity of Polyurethane Material Including TEG

Polyurethane coupons are prepared as described in Example 1, except that the DEG-containing polyester polyols are replaced with TEG-containing polyester polyols.

Resistance of the polyurethane coupons is measured, as described in Example 1. The resistivity of the polyurethane coupons is lower than the resistivity of polyurethane coupons that do not include TEG.

What is claimed is:

1. A method of forming a a developer system, comprising:

forming a developer roller comprising a homogeneous dispersion of at least one alkaline salt and a polyol, wherein the polyol comprises at least one moiety selected from the group consisting of ethylene glycol (“EG”), di(ethylene glycol) (“DEG”), tri(ethylene glycol) (“TEG”), tetra(ethylene glycol), poly(diethylene glycol), poly(ethylene oxide), and mixtures thereof; and providing a power supply in operative communication with the developer roller.

2. The method of claim 1, wherein combining at least one alkaline salt and a polyol comprises combining at least one alkaline salt selected from the group consisting of lithium perchlorate (“$LiClO_4$”), lithium tetrafluoroborate ($LiBF_4$), lithium hexafluorophosphate ($LiPF_6$), lithium trifluoromethane sulfonate ($LiCF_3SO_3$), lithium bis (trifluoromethanesulfonyl) imide ($LiN(CF_3SO_2)_2$), lithium bis (perfluoroethylsulfonyl) imide ($LiN(SO_2CF_2CF_3)_2$), lithium (trifluoromethylsulfonyl)(perfluorobutylsulfonyl) imide ($LiN(CF_3SO_2)(C_4F_9SO_2)$), lithium tris (trifluoromethanesulfonyl) methane ($LiC(CF_3SO_2)_3$), and mixtures thereof with the polyol.

3. The method of claim 1, wherein combining at least one alkaline salt and a polyol comprises combining from approximately 0.01% by weight ("wt %") of a total weight of the polymer material to approximately 10 wt % of the total weight of the polymer material of the at least one alkaline salt with the polyol.

4. The method of claim 1, further comprising curing the at least one alkaline salt and the polyol to form the polymer material.

5. A developer system, comprising:

a developer roller comprising a homogeneous dispersion of polyurethane material, wherein the polyurethane material comprises a polyol and at least one alkaline salt, the polyol comprising at least one moiety selected from the group consisting of ethylene glycol ("EG"), diethylene glycol ("DEG"), tri(ethylene glycol) ("TEG"), tetra(ethylene glycol), poly(diethylene glycol), poly(ethylene oxide), and mixtures thereof; and a power supply in operative communication with the developer roller.

6. The developer system of claim 5, wherein the at least one alkaline salt is selected from the group consisting of lithium perchlorate ("$LiClO_4$"), lithium tetrafluoroborate ($LiBF_4$), lithium hexafluorophosphate ($LiPF_6$), lithium trifluoromethane sulfonate ($LiCF_3SO_3$), lithium bis (trifluoromethanesulfonyl) imide ($LiN(CF_3SO_2)_2$), lithium bis (perfluoroethylsulfonyl) imide ($LiN(SO_2CF_2CF_3)_2$), lithium (trifluoromethylsulfonyl)(perfluorobutylsulfonyl) imide ($LiN(CF_3SO_2)(C_4F_9SO_2)$), lithium tris (trifluoromethanesulfonyl) methane ($LiC(CF_3SO_2)_3$), and mixtures thereof.

7. The developer system of claim 5, wherein the at least one alkaline salt comprises from approximately 0.01% by weight ("wt %") of a total weight of the polyurethane material to approximately 10 wt % of the total weight of the polyurethane material.

8. An electrophotographic device for forming images, comprising:

a roller comprising a polyurethane material, wherein the polyurethane material comprises a homogeneous dispersion of a polyol and at least one alkaline salt, the polyol comprising at least one moiety selected from the group consisting of ethylene glycol ("EG"), diethylene glycol ("DEG"), tri(ethylene glycol) ("TEG"), tetra (ethylene glycol), poly(diethylene glycol), poly(ethylene oxide), and mixtures thereof; and a photoreceptor and a toner applicator roller located proximate the roller.

9. The electrophotographic device of claim 8, wherein the at least one alkaline salt is selected from the group consisting of lithium perchlorate ("$LiClO_4$"), lithium tetrafluoroborate ($LiBF_4$), lithium hexafluorophosphate ($LiPF_6$), lithium trifluoromethane sulfonate ($LiCF_3SO_3$), lithium bis (trifluoromethanesulfonyl) imide ($LiN(CF_3SO_2)_2$), lithium bis (perfluoroethylsulfonyl) imide ($LiN(SO_2CF_2CF_3)_2$), lithium (trifluoromethylsulfonyl)(perfluorobutylsulfonyl) imide ($LiN(CF_3SO_2)(C_4F_9SO_2)$), lithium tris (trifluoromethanesulfonyl) methane ($LiC(CF_3SO_2)_3$), and mixtures thereof.

10. The electrophotographic device of claim 8, wherein the at least one alkaline salt comprises from approximately 0.01% by weight ("wt %") of a total weight of the polyurethane material to approximately 10 wt % of the total weight of the polyurethane material.

11. The electrophotographic device of claim 8, wherein the roller is selected from the group consisting of a developer roller, a transfer roller, and a charge roller.

12. The electrophotographic device of claim 8, wherein the electrophotographic device is a liquid electrophotographic device or a dry electrophotographic device.

13. The electrophotographic device of claim 8, wherein the electrophotographic device is a laser printer.

14. The electrophotographic device of claim 8, wherein the electrophotographic device is a liquid electrophotographic system.

15. A method of forming an electrophotographic device, comprising:

forming a roller comprising polymer material, wherein the polymer material comprises a homogeneous dispersion of at least one alkaline salt and a polyol, wherein the polyol comprises at least one moiety selected from the group consisting of ethylene glycol ("EG"), di(ethylene glycol) ("DEG"), tri(ethylene glycol) ("TEG"), tetra(ethylene glycol), poly(diethylene glycol), poly(ethylene oxide), and mixtures thereof; and providing a photoreceptor and a toner applicator roller located proximate the roller.

16. The method of claim 15, wherein the step for forming the polymer material comprises a step for combining at least one alkaline salt selected from the group consisting of lithium perchlorate ("$LiClO_4$"), lithium tetrafluoroborate ($LiBF_4$), lithium hexafluorophosphate ($LiPF_6$), lithium trifluoromethane sulfonate ($LiCF_3SO_3$), lithium bis (trifluoromethanesulfonyl) imide ($LiN(CF_3SO_2)_2$), lithium bis (perfluoroethylsulfonyl) imide ($LiN(SO_2CF_2CF_3)_2$), lithium (trifluoromethylsulfonyl)(perfluorobutylsulfonyl) imide ($LiN(CF_3SO_2)(C_4F_9SO_2)$), lithium tris (trifluoromethanesulfonyl) methane ($LiC(CF_3SO_2)_3$), and mixtures thereof with the polyol.

17. The method of claim 15, wherein the step for forming the polymer material comprises a step for combining from approximately 0.01% by weight ("wt %") of a total weight of the polymer material to approximately 10 wt % of the total weight of the polymer material of the at least one alkaline salt with the polyol.

18. The method of claim 15, further comprising curing the at least one alkaline salt and the polyol to form the polymer material.

* * * * *